April 27, 1926.

T. ZETTERLUND 1,582,568

PRESS CLUTCH

Filed Nov. 23, 1922    3 Sheets-Sheet 1

Inventor
Theodor Zetterlund

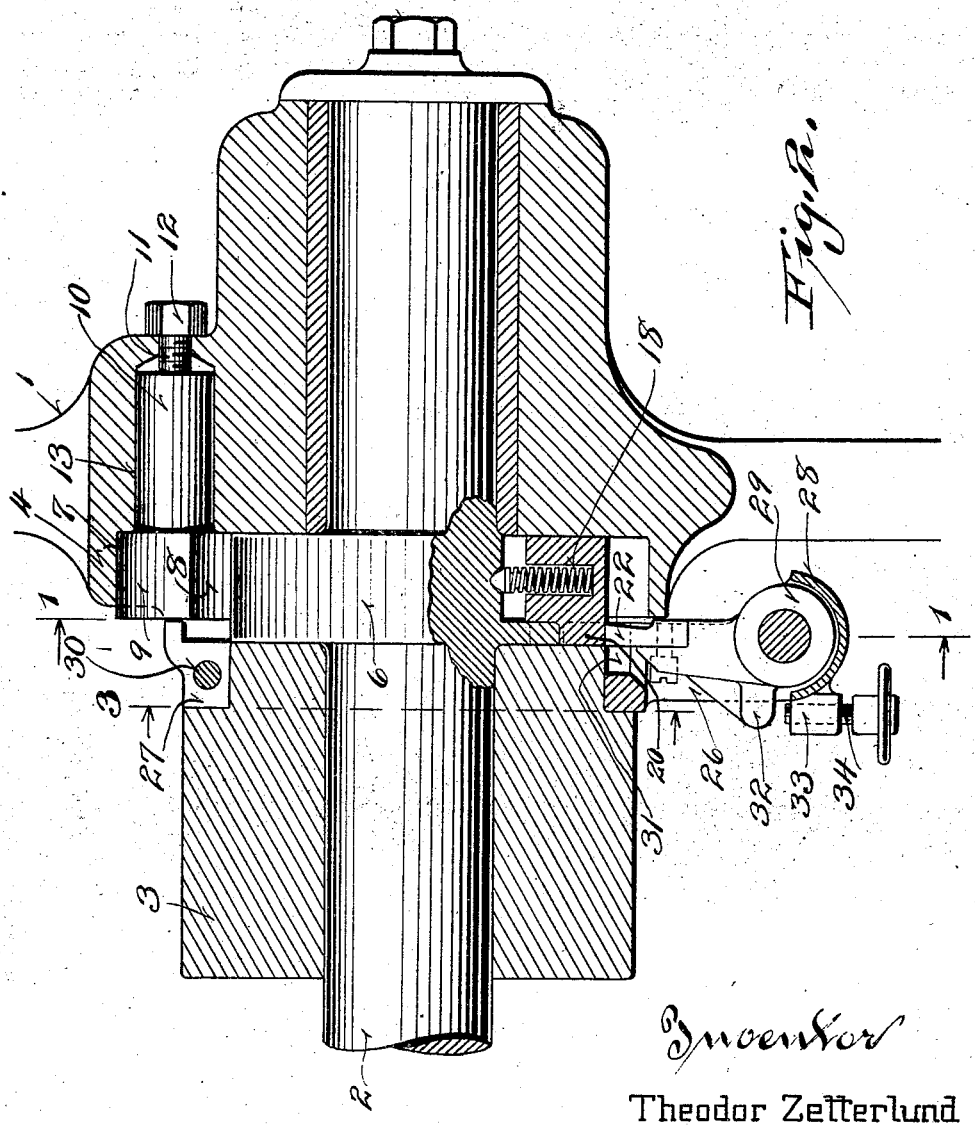

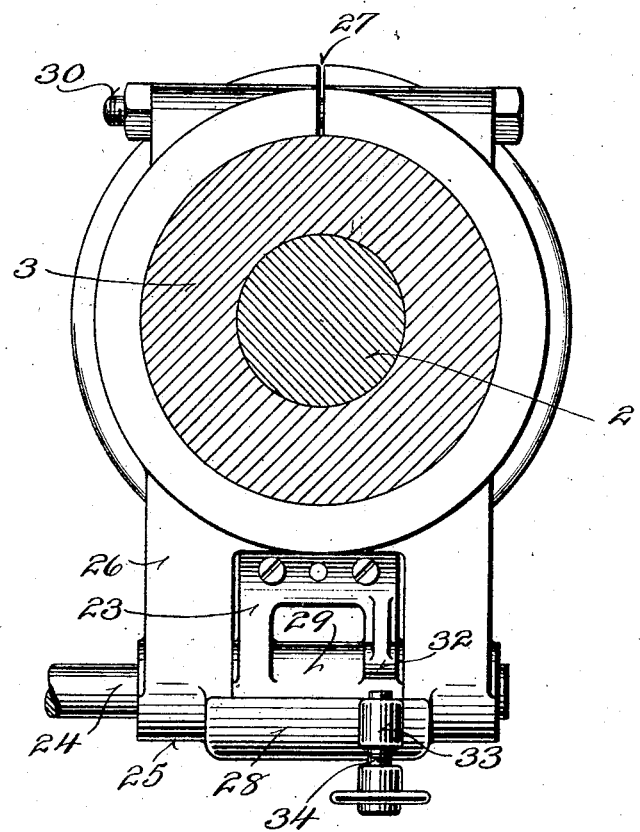

Patented Apr. 27, 1926.

1,582,568

UNITED STATES PATENT OFFICE.

THEODOR ZETTERLUND, OF MILWAUKEE, WISCONSIN, ASSIGNOR TO MILWAUKEE PRESS & MACHINE COMPANY, OF MILWAUKEE, WISCONSIN.

PRESS CLUTCH.

Application filed November 23, 1922. Serial No. 602,805.

*To all whom it may concern:*

Be it known that I, THEODOR ZETTERLUND, a citizen of the United States, and resident of Milwaukee, in the county of Milwaukee and State of Wisconsin, have invented certain new and useful Improvements in Press Clutches; and I do hereby declare that the following is a full, clear, and exact description thereof.

My invention relates broadly to new and useful improvements in clutches, and more particularly to punch devices for use on punch presses and similar press machinery.

As press clutches are at present constructed, most of them are relatively short lived and it is necessary after a limited amount of use to replace certain parts. Obviously when a relatively rapidly moving element comes in contact with a stationary element, the force of impact is great and unless the contacting parts are of requisite strength, the weaker parts will be mutilated or displaced to a certain extent. Consequently when the clutch dog engaging elements strike the clutch dog in punch presses or similar press machinery, there is a tendency of the former to be broken or sheared off.

Therefore it is the primary object of this invention to provide an arrangement whereby the different contacting parts of a press clutch may be suitably reinforced so as to eliminate the foregoing difficulty.

A further object of the invention is to provide a simple and efficient arrangement for selectively tripping a clutch dog to move it out of operative engagement with the clutch dog engaging members, and in this connection it is a subsidiary object to lock the clutch dog in this position while the different parts of the press are being adjusted, etc., or while new dies are being placed in the press head.

It is still another object of the invention to provide a simply constructed clutch of this general character, the parts of which can be readily assembled or replaced, and which will be extremely efficient in operation.

With these general objects in view my invention resides in the novel features of construction, combination and arrangement of parts, which will be hereinafter more particularly described and claimed.

In the accompanying drawings:

Figure 2 is a longitudinal sectional view taken approximately upon the plane of the line 2—2 of Figure 1.

Figure 3 is an additional transverse section on the plane of the line 3—3 of Figure 2.

Figure 1:
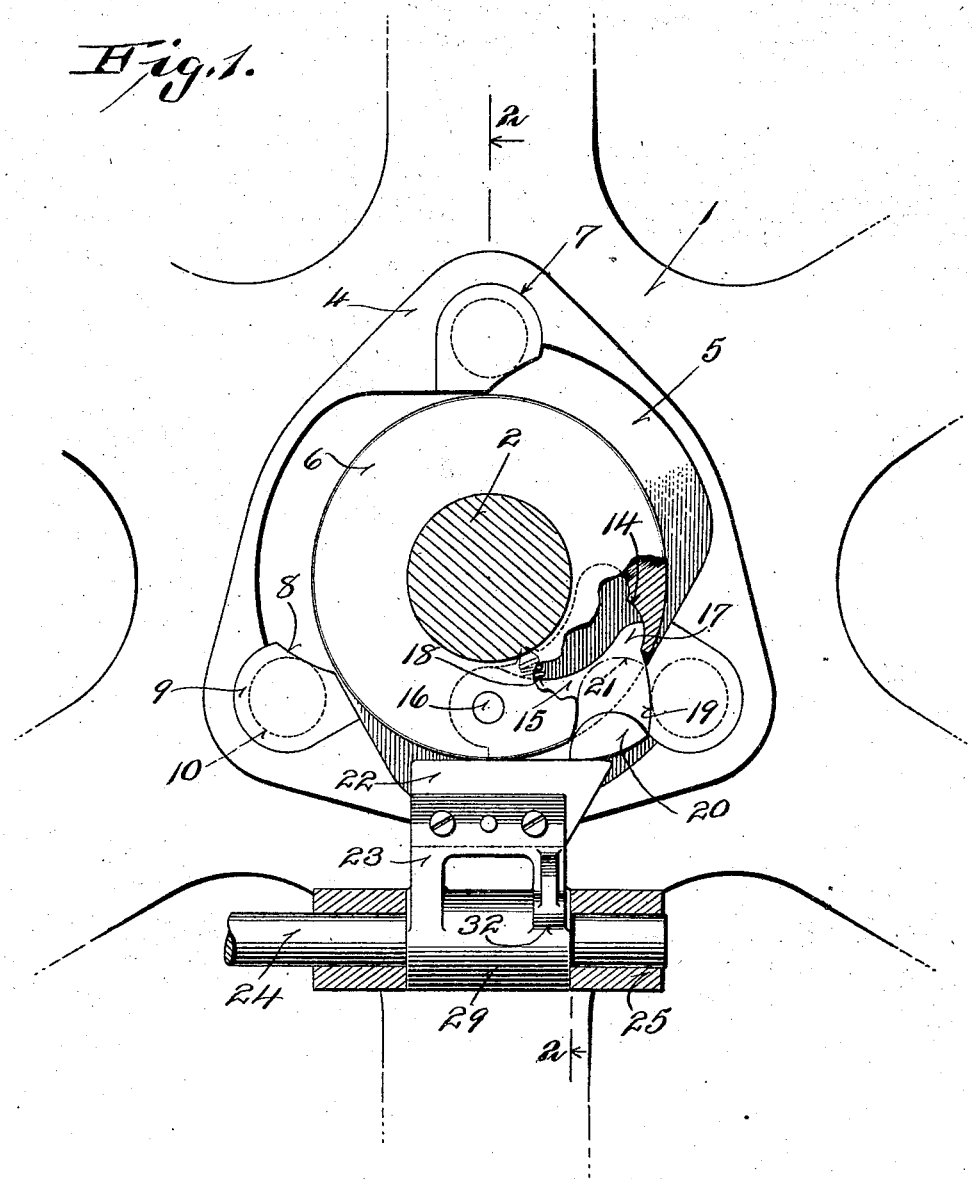
Figure 1 represents a transverse sectional view of the co-operating parts of a clutch constructed in accordance with the invention, the section being taken substantially on the plane of the line 1—1 of Figure 2.

In the preferred embodiment of the invention as shown in the several figures of the drawings, the reference character 1 denotes the hub portion of a drive wheel which it is desired to lock at predetermined times to a driven shaft 2, the portion of which adjacent the wheel is supported in a bearing 3.

When the drive wheel is not locked to the shaft 2, it freely rotates thereon while said shaft remains stationary. The drive wheel 1 is continuously rotated by any suitable driving mechanism and the shaft 2 is connected with other mechanism which is designed to be intermittently actuated.

The hub of the drive wheel surrounding the bearing opening therein which receives the shaft 2 is provided with a boss 4, and the same has a socket 5 in which a collar or flange 6 formed on the shaft 2 is disposed. The boss 4 in addition to the socket 5 is also provided with a plurality of head receiving recesses 7, the inner portions of which open through the wall of said socket 5 so as to position the contact faces 8 of the clutch heads 9 therein. Said heads 9 are detachably, yet securely mounted in said recesses 7 by means of shanks 10 on which the heads are integrally formed together with threaded stems 11 and nuts 12. As shown most clearly in Figure 2, the recesses 7 coincide with shank receiving bores 13 formed through the hub 1 axially thereof, said stems 11 being extended through openings in the bottom of said bores. Thus by threading the nuts 12 on said stems 11, the heads 9 can be rigidly seated in the recesses 7.

The flange 6 is provided with a dog receiving pocket 14 in which a clutch dog 15 is pivotally mounted at one end by fulcrum pin 16. The pivot end of the dog is arcuate as is also the adjacent end of the pocket, the wall of both of these parts being concentric with the fulcrum pin axis, so that the end of the pocket, while permitting the dog to move orbitally therein, will form a stop surface against which the end of the dog may abut when the same is struck by one of the heads 9.

The free end of the dog 15 has a stop lip 17 which is adapted to engage with one wall of the pocket 14 to limit movement of said dog away from the axis of the shaft 2, it being normally urged in such direction by the provision of an expansible spring 18 located between the inner wall of the pocket and the adjacent wall of the same. The clutch dog 15 has a contact face 19 for engagement by the contact faces 8 of the several heads 9, the surface of all of these several faces being formed on an arc concentric with the axis of the fulcrum pin 16 so that the clutch dog can be readily shifted from the position shown in Figure 1 into the pocket 14. Furthermore a structure of this character permits the force exerted by the drive wheel to be transmitted to the shaft 2 tangentially thereof, this being also noticeable from the last referred to figure.

Although the dog 15 is adapted to be housed within the pocket 14, it is provided with a trip lug 20 which is always disposed exteriorly of the pocket 14. When the dog 15 is active and arranged as shown in Figure 1, the trip lug 20 is positioned substantially beyond the periphery of the flange 6, but when the same is located within the pocket 14, said lug is seated in a notch 21 formed in said flange 6. This lug is designed to be engaged with a trip plate 22 carried by a rocking trip arm 23.

Said trip arm 23 is fixed to a rock shaft 24 and located between rock shaft bearings 25. These bearings 25 are formed on the ends of bearing ears 26 which are carried by a clamp collar 27 secured about the bearing 3 adjacent the boss 4. The bearings 25 are connected by a semi-cylindrical bridge plate 28 receiving the cylindrical rock shaft embracing portion 29 of the trip arm 23, whereas the ends of the clamp collar 27, which is split, are secured together and the collar clamped about bearing 3 by means of a clamp screw 30. It is to be noted from reference to the drawings that the clamping collar 27 may be adjustably secured about the bearing in any desired position to determine the exact point at which the release mechanism will operate.

The trip plate 22 is movable to either one of two positions by rocking the shaft 24, in one of said positions the plate 22 being in the path of movement of the trip lug, and in the other position being out of said path of movement and disposed in a recess 31 formed in the collar 27. When said trip plate is in the path of movement of the trip lug 20, it is impossible for the drive wheel to be locked to the shaft 2, therefore means is provided to prevent rocking of the trip arm under certain conditions. In other words said trip arm has a locking lug 32, while the bridge plate 28 carries a screw bearing 33 in which a locking screw 34 is threaded. As shown in Figure 2 by moving up the screw 34, its end may be brought into engagement with the lug 32 and the trip arm held against rocking so that the trip plate 22 will be retained in the path of movement of the trip lug 20.

When the apparatus heretofore described is in use, suitable means is provided for rocking the shaft 24 as is customary in press machinery, but it will be appreciated that upon each rocking of said shaft the trip plate 22 will be shifted out of the path of movement of the trip lug 20, thus permitting the clutch dog to be forced outwardly by the spring 18 into the path of travel of the several heads 9. Thus as the rotating drive wheel brings one of the heads into engagement with the contact face 19 of the clutch dog, the shaft 2 will be locked to said drive wheel and rotated therewith so long as the clutch dog is permitted to remain in its active position as shown in Figure 1. Normally, however, as soon as the trip plate 22 is moved out of the path of the trip lug 20 and the clutch dog 15 is rotated by the drive wheel beyond the former, it is permitted to return to the position as shown in Figure 2 so as to again be located to trip the clutch dog when the same is brought into proximity thereto. In other words the shaft 2 is permitted only one revolution after being locked to the drive wheel before the same is unlocked and the wheel permitted to rotate freely.

I claim:

1. A clutch comprising a driving element, a driven element, a socketed boss on one of the elements, a movable clutch dog carried by the other element and disposed in the socket on said boss, a trip lug on the dog and projecting from said socket, a clutch dog engaging member carried by the boss and having a contact face within said socket, a trip selectively movable into and out of the path of movement of the trip lug and means directly engaging said trip for locking the trip in the path of movement of the trip lug.

2. A clutch comprising a driving element, a driven element, a socketed boss on one of the elements, a movable clutch dog carried by the other element and disposed in the socket on said boss, a trip lug on the dog and projecting from said socket, a clutch dog engaging member carried by the boss and having a contact face within said socket, a trip selectively movable into and out of the path of movement of the trip lug and means directly engaging said trip for locking the trip in the path of movement of the trip lug.

3. A clutch comprising a bearing, a driven element journaled in said bearing, a driving element, a pivoted clutch dog carried by the driven element, a clutch dog engaging member carried by the driving element, a trip lug projecting from said clutch dog, a collar surrounding said bearing, means for clamping said collar tightly around said bearing in any adjusted position, a trip pivotally carried by said collar, and means for selectively moving the trip into and out of the path of travel of the trip lug.

In testimony that I claim the foregoing I have hereunto set my hand at Milwaukee, in the county of Milwaukee and State of Wisconsin.

THEODOR ZETTERLUND.